UNITED STATES PATENT OFFICE.

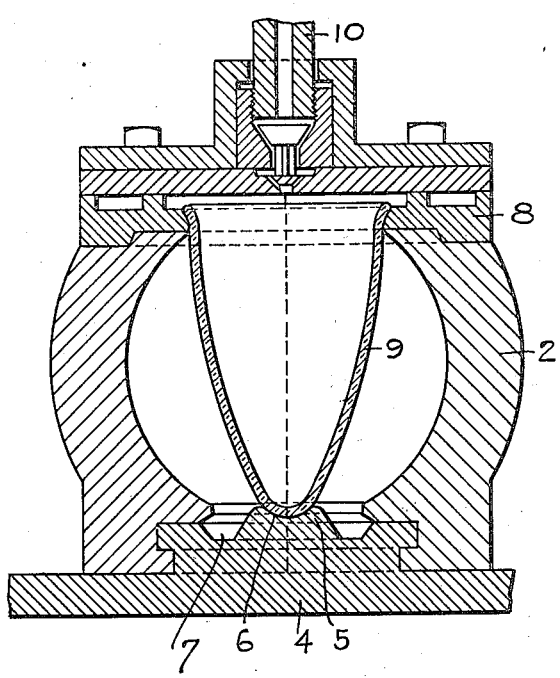
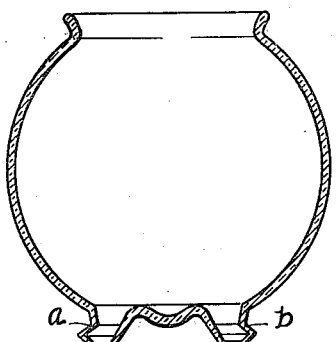
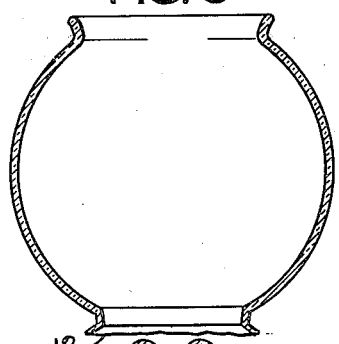
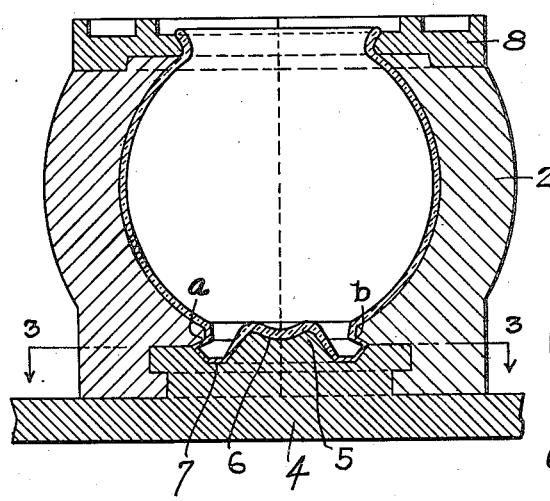
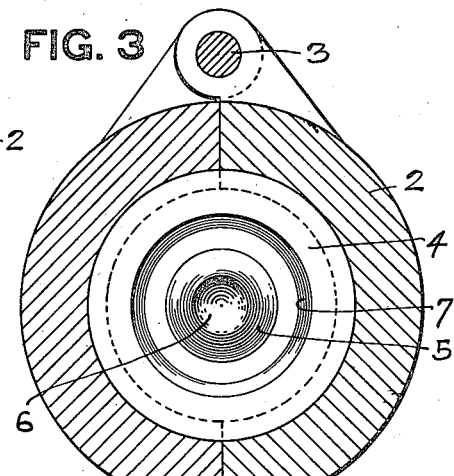

FREDERICK W. STEWART, OF BEAVER, PENNSYLVANIA, ASSIGNOR OF ONE-HALF TO PHOENIX GLASS COMPANY, OF PITTSBURGH, PENNSYLVANIA, A CORPORATION OF WEST VIRGINIA.

MOLD FOR GLASSWARE.

1,259,157.     Specification of Letters Patent.     Patented Mar. 12, 1918.

Application filed June 20, 1916. Serial No. 104,669.

*To all whom it may concern:*

Be it known that I, FREDERICK W. STEWART, a citizen of the United States, and resident of Beaver, in the county of Beaver and State of Pennsylvania, have invented a new and useful Improvement in Molds for Glassware; and I do hereby declare the following to be a full, clear, and exact description thereof.

My invention relates to molds for glassware, and more especially to a mold for blowing articles having an opening at each end, such as globes, shades, etc.

The object of my invention is to provide a mold of this character in which the previously pressed blank is so supported that when the blowing operation takes place, the article will be blown out to conform to the mold cavity, but the portion of the glass forming the closed end and before cracking off will be blown thinner than the main body of the article, so that the cracking off can be effected easily and without liability of injury to the main body of the globe.

To these ends, my invention comprises the novel features hereinafter set forth and claimed.

In the drawing, Figure 1 is a sectional view of my improved mold; Fig. 2 is a like view showing the article blown therein: Fig. 3 is a section on the line 3—3, Fig. 2; Fig. 4 shows the article when blown and removed from the mold; and Fig. 5 shows the article after the cracking-off operation.

In the drawings, the numeral 2 designates an ordinary two-part blow-mold, the parts being hinged as at 3. The bottom 4 has the raised central portion 5 with the concave seat 6 formed therein. This raised portion forms the annular recess 7 extending below the main mold cavity.

The neck ring 8 is of any suitable construction, and is adapted to rest upon the mold 2. This neck ring forms part of the pressed mold in which the blank 9 was originally pressed and the neck ring carrying the blank is brought over from the pressed mold in the ordinary manner and introduced into the blow-mold. When the neck ring is adjusted on the blow-mold, the inner end portion of the blank rests in the concave seat 6 of the raised portion 5 in the bottom of the mold, and in this position the air is admitted to the blank through the blow-pipe 10. The introduction of the air or other gaseous fluid to blow the glass out to conform to the mold cavity, the glass being blown to substantially even thickness of wall throughout the article itself, but that portion of the glass which is blown down into the recess 7 is thinned due to the chilling action on the inner end of the blank, due to the contact of the blank with the iron of the mold. The consequence is that the overflow, or portion that is blown down into the recess 7 as stated, will form a thinned portion up to the line *a—b* where the finished article ends. When the blowing operation is completed, the mold is opened and the article removed, leaving the closed end portion 11, which is to be cracked off. This may readily be done by inserting an instrument within the mold and tapping on the end portion 11 whereupon the glass will separate at the thinned portion, as indicated in Fig. 5, leaving the roughened edge 12 to be removed by grinding or in the ordinary manner.

By my invention, I provide a very simple form of mold by means of which the portion to be cracked off is blown with thinned walls, so that it is readily detached from the main body of the article without liability of breaking or cracking the article.

What I claim is:

A blow-mold comprising side walls and bottom, the bottom having a recessed central portion extending above the end of the finished article and forming with the side walls below the end of the finished article an annular recess whereby the glass is blown thinner in said recess.

In testimony whereof, I the said FREDERICK W. STEWART, have hereunto set my hand.

FREDERICK W. STEWART.

Witnesses:
   JOHN F. WILL,
   IRENE F. GEYER.